(12) United States Patent
Retter et al.

(10) Patent No.: US 10,331,903 B2
(45) Date of Patent: Jun. 25, 2019

(54) DEVICE AND METHOD FOR PROCESSING USER-SPECIFIC DATA FROM A VEHICLE

(71) Applicant: Robert Bosch GmbH, Stuttgart (DE)

(72) Inventors: Ralph Retter, Stuttgart (DE); Stefan Schmid, Waiblingen (DE); Jan Zibuschka, Magstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 246 days.

(21) Appl. No.: 15/236,063

(22) Filed: Aug. 12, 2016

(65) Prior Publication Data

US 2017/0046533 A1 Feb. 16, 2017

(30) Foreign Application Priority Data

Aug. 13, 2015 (DE) ........................ 10 2015 215 481

(51) Int. Cl.
| | |
|---|---|
| *G06F 12/14* | (2006.01) |
| *G06F 13/00* | (2006.01) |
| *G06F 7/00* | (2006.01) |
| *G06F 21/62* | (2013.01) |
| *G06F 21/31* | (2013.01) |
| *H04W 4/021* | (2018.01) |
| *G06F 16/29* | (2019.01) |
| *G06F 16/23* | (2019.01) |

(52) U.S. Cl.
CPC ...... *G06F 21/6245* (2013.01); *G06F 16/2358* (2019.01); *G06F 16/29* (2019.01); *G06F 21/31* (2013.01); *H04W 4/021* (2013.01)

(58) Field of Classification Search
None
See application file for complete search history.

(56) References Cited

U.S. PATENT DOCUMENTS

| | | | |
|---|---|---|---|
| 2002/0188887 A1* | 12/2002 | Largman | G06F 11/1417 714/13 |
| 2005/0278544 A1* | 12/2005 | Baxter | G06F 17/30902 713/182 |
| 2013/0117857 A1* | 5/2013 | Zimmermann | G06F 21/6218 726/27 |

(Continued)

FOREIGN PATENT DOCUMENTS

| | | |
|---|---|---|
| DE | 10 2010 030 794 A1 | 1/2012 |
| DE | 102012213007 A1 | 1/2014 |

OTHER PUBLICATIONS

Microsoft, Feb. 2011, Windows 7 Privacy Statement, at least section titled: "location and other sensors" (Year: 2011).*

*Primary Examiner* — Kambiz Zand
*Assistant Examiner* — Arezoo Sherkat
(74) *Attorney, Agent, or Firm* — Morton Rose Fulbright US LLP; Gerard Messina

(57) ABSTRACT

A method is described for processing of user-specific data in a vehicle; in particular, the processing of user-specific data in control systems of a vehicle, such as a navigation system or an entertainment system, for example. For this purpose, the device for processing user-specific data is expanded by a private operating mode. In this private operating mode, there is no persistent storage of user inputs and/or the resulting processing results. After termination of the newly created private operating mode, the data stored during the private operating mode are deleted immediately.

11 Claims, 2 Drawing Sheets

(56) References Cited

U.S. PATENT DOCUMENTS

| | | | | |
|---|---|---|---|---|
| 2014/0195100 A1* | 7/2014 | Lundsgaard | ......... | G07C 5/0841 |
| | | | | 701/29.6 |
| 2014/0240089 A1* | 8/2014 | Chang | ................ | G07C 9/00111 |
| | | | | 340/5.61 |
| 2015/0052619 A1* | 2/2015 | Kwak | ................ | G06F 21/6245 |
| | | | | 726/28 |
| 2016/0059864 A1* | 3/2016 | Feit | ........................ | B60K 35/00 |
| | | | | 701/36 |

* cited by examiner

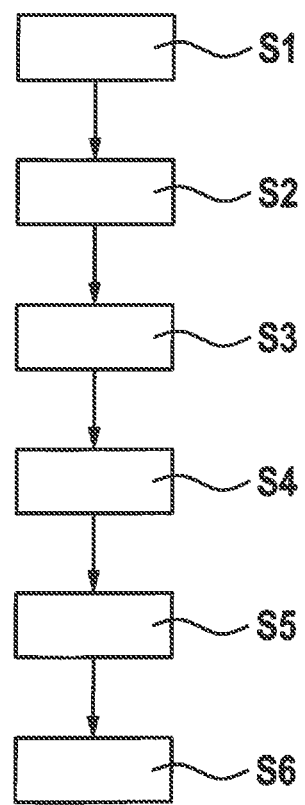

DEVICE AND METHOD FOR PROCESSING USER-SPECIFIC DATA FROM A VEHICLE

RELATED APPLICATION INFORMATION

The present application claims priority to and the benefit of German patent application no. 10 2015 215 481.5, which was filed in Germany on Aug. 13, 2015, the disclosure of which is incorporated herein by reference.

FIELD OF THE INVENTION

The present invention relates to a device and a method for processing user-specific data. In particular the present invention relates to the processing of user-specific data from a vehicle as well as a vehicle, including a device for processing user-specific data.

BACKGROUND INFORMATION

German Patent Application DE 10 2012 213 007 A1 discusses a control system for a vehicle and a method for operating a control unit for controlling a vehicle component. As a client, a control unit sends a query to a vehicle server. The vehicle server forms a response in accordance with the query and sends the response to the control unit. The control unit controls the vehicle component based on the response.

Control of modern vehicles requires increasing processing of individual and sometimes user-specific data. These data may include, for example, the instantaneous position of the vehicle, a destination entered by a user, a trip route or the like. In addition, a user may also request, for example, position-based recommendations for so-called points of interest. These recommendations may include, for example, suggestions for certain businesses, restaurants, etc. In addition, based on a user's known habits, suitable suggestions for musical items, preferred radio stations or the like may also be selected by an entertainment system. By keeping logs and taking into account previous user inputs, conclusions may be drawn about user habits. Based on these conclusions, a corresponding system is able to deliver automatically optimized recommendations, which correspond to user habits with a high probability.

However, these pieces of information about user habits are sensitive personal data. It is not always desirable for these personal data to be accessible to third parties. For example, if one vehicle is used by several people, it is not always desirable for each individual person to be able to access the user habits of the other people or, if necessary, receive recommendations based on the user habits of the other people.

There is therefore a demand for processing of user-specific data, which will enable confidential processing of the user-specific data. In particular, there is a need for processing of user-specific data from a vehicle, which makes it possible to not make the user-specific data and the processing results obtained from them available to third parties.

SUMMARY OF THE INVENTION

The present invention therefore creates a device for processing user-specific data according to the description herein.

Accordingly, the present invention creates a device for processing user-specific data from a vehicle, including an input device, a processing device and a data memory. The input device is configured to receive user inputs. The input device is configured in particular to receive a selection for activation or deactivation of a private operating mode. The processing device is configured to generate a processing result based on the user inputs. The processing device is configured to switch to a private operating mode when a selection for the private operating mode has been received by the input device. The data memory is configured to at least partially store the user inputs received by the input device and/or the processing results generated by the processing device. The processing device is further configured to at least partially delete the processing results and/or the user inputs stored during the activated private operating mode or to at least partially prevent the storage of received user inputs and/or generated processing results.

According to an additional aspect, the present invention creates a method for processing user-specific data according to the description herein.

Accordingly, the present invention creates a method for processing user-specific data from a vehicle, including the steps of receiving user inputs, whereby the user inputs include a selection for activation or deactivation of a private operating mode, and the switch to a private operating mode when a user input has been received for activation of the private operating mode. The method additionally includes a step for generating a processing result based on the received user inputs and a step for storing received user inputs and/or generated processing results in a database. Furthermore, the method includes a step for deleting user inputs stored in the data memory and/or deleting stored processing results stored during the private operating mode. The corresponding data in the data memory are deleted at the latest upon reception of a user input for deactivation of the private operating mode.

The present invention is based on the aspect of creating another private operating mode in addition to a normal operating mode with persistent data storage. In this private operating mode, there is no persistent data storage for at least some of the user inputs or the resulting processing results. The data are instead partially deleted, in particular inasmuch as the data include personal and user-specific information, as quickly as possible or at least upon termination of the private operating mode at the latest. It is possible in this way to ensure that these data cannot be read out by another user at a later point in time. It is also possible in this way to prevent use of these user inputs or processing results as the basis for subsequent processing. User-specific data from a user therefore do not enter into subsequent processing results, in particular into processing results for another user.

Due to the discretionary activation and deactivation of the newly created private operating mode for processing data from a vehicle, confidential processing of user-specific data may take place at any point in time. In particular by deactivating the private operating mode, it is possible to ensure at any point in time that the corresponding user-specific data are deleted immediately. Thus, even when there is a brief change in user, such as a change of the driver of a vehicle, for example, or when a passenger enters a vehicle, immediate deletion of the user-specific data is possible by termination of the private operating mode.

On the other hand, introducing the private operating mode for processing user-specific data may create an option of entering a plurality of data, in particular including personal data, during the private operating mode or allowing it to be processed by the system. Precautionary filtering of user-specific data or processing of data, omitting personal data partially or entirely for security reasons, is thus not necessary. It is thus possible to create a foundation of trust for a user, making it possible for personal data to be created by the user for an accurate and optimized data processing even during the private operating mode.

According to one specific embodiment, the user inputs and/or the processing results are stored in encrypted form in the data memory. Data stored in the data memory are additionally protected in this way.

According to another specific embodiment, data stored in the data memory during the private operating mode are deleted by being overwritten by other data. The data may be deleted by overwriting of the data by certain data patterns or random data in particular. This permits particularly reliable deletion of data stored during the private operating mode, so that these data cannot be read out by an unauthorized person at a later point in time.

According to one specific embodiment, the data memory includes an internal memory device in the vehicle itself and/or an external database. The external database may be coupled to the vehicle via an arbitrary connection.

According to another specific embodiment, the processing device is configured to restrict the storage of data in the data memory in an activated operating mode. For example, only specific, previously defined data or data structures may be stored in the data memory in this way during the private operating mode. However, additional data, optional data or data structures, if necessary, are not stored in the data memory in an activated private operating mode. The security of personal data may be further enhanced by such a restriction of the storage of data during the private operating mode.

According to another specific embodiment, the device for processing user-specific data includes a first communication device. This first communication device is configured to transmit data from the device for processing user-specific data to a data processing device. The user-specific data thereby transmitted include in particular a piece of information about the selection for activation or deactivation of the private operating mode. The data processing device may be another data processing device integrated into the vehicle such as a separate control device or the like, for example. In addition, the data processing device may also be an external data processing device, situated outside of the vehicle. For example, the data processing device may be one or multiple servers in a computer center or the like. Communication between the device for processing the user-specific data and the data processing device may take place wirelessly in particular, for example, over a mobile communications link or the like.

According to another specific embodiment, the first communication device is configured to restrict the transmission of data to the data processing device during an activated private operating mode. Transmission of optional personal data may be restricted or prevented in particular.

According to another aspect, the present invention creates a data processing device including a second communication device and a database. The second communication device is configured to receive data from a device according to the present invention for processing user-specific data. The database is configured to store at least some of the data received from the second communication device. The storage of data in the database may be restricted if the information about the selection for activation or deactivation of the private operating mode indicates that the private operating mode has been activated. In the case of an activated private operating mode, the confidentiality of the corresponding data in the internal or external data processing device may also be ensured in this way.

According to another aspect, the present invention creates a vehicle, including a device according to the present invention for processing user-specific data.

According to another specific embodiment, the stored user inputs and/or processing results is/are deleted at least in part in the step for deleting the user inputs and/or processing results in the data memory if a user input has been received for deactivation of the private operating mode. It is possible in this way to ensure that the relevant personal data are deleted on termination of the private operating mode at the latest.

According to another specific embodiment, the method for processing user-specific data includes a step for transmitting data to a data processing device. The transmitted data include information about the selection for activation or deactivation of the private operating mode.

According to another specific embodiment, the processing results include a position, a route, a speed, a statistical analysis and/or the result of a search. The statistical analysis may involve, for example, the analysis of user inputs. For example, the frequency of selection of certain user inputs may be analyzed.

According to another specific embodiment, the data transmitted to the data processing device include user inputs, processing results and/or information about the condition of the vehicle. The transmitted data may also include information about the interior of the vehicle and/or the surroundings of the vehicle. In particular the transmitted data may include, for example, a location, a destination, a trip route, specification of certain musical pieces or a certain type of music, a predefined driving style or preferred types of roads or the like. These data may be detected by suitable sensors, for example.

According to another specific embodiment, the step for generating processing results generates the processing results based on data detected by sensors. In particular data from a vehicle sensor may be used to generate the processing results.

According to another specific embodiment, after a user input for activation of the private operating mode has been received, the storage of user inputs and/or processing results is suppressed and/or restricted on the basis of user inputs. Data from user inputs and processing results already entered or generated before activation of the private operating mode may be used for generating the processing results. Good, detailed assistance may be ensured for the user in the vehicle in this way, without having to persistently store sensitive data during the activated private operating mode.

Additional specific embodiments and advantages of the present invention are derived from the following description with reference to the accompanying drawings.

BRIEF DESCRIPTION OF THE DRAWINGS

FIG. 3 shows a schematic representation of a flow chart, such as that used as the basis for a method for processing user-specific data according to one specific embodiment.

DETAILED DESCRIPTION

Figure 1:
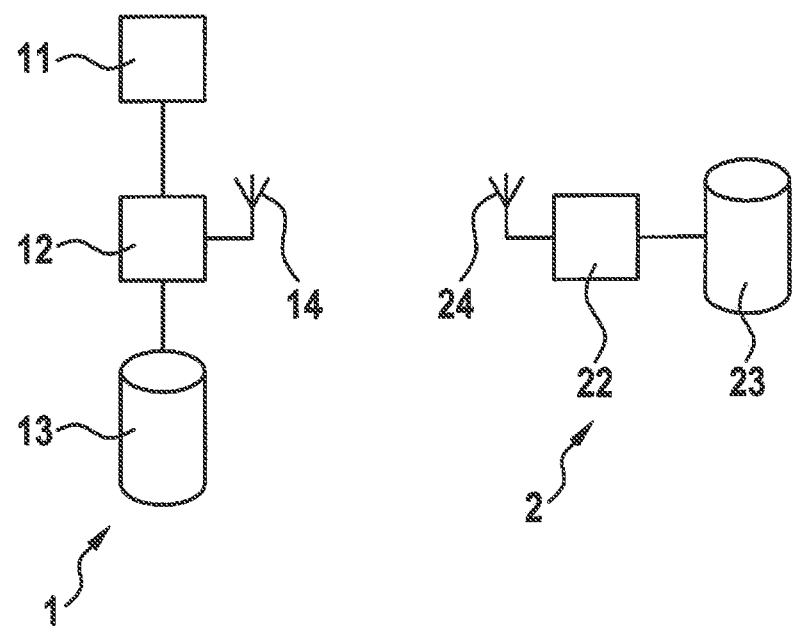
FIG. 1 shows a schematic representation of a device for processing user-specific data according to one specific embodiment.

FIG. 1 shows a schematic representation of a device for processing user-specific data, such as that underlying one specific embodiment. Device 1 for processing the user-specific data includes an input unit 11, a processing unit 12 and a data memory 13, 23. Data memory 13, 23 may include an internal storage device 13 in vehicle 3 and an external database 23, which is connected to the vehicle by an arbitrary data link. In particular, device 1 for processing user-specific data may include a first communication unit 14. A link to a data processing unit 2, which may be wireless, including a second communication unit, may be established via this first communication unit 14. This data link between first communication unit 14 and second communication unit 24 may be a wireless radio link in the form of a mobile communications link or the like. Data processing unit 2 also includes a processing unit 22 and a database 23.

Device 1 for processing user-specific data may be in particular an arbitrary device for processing data in a vehicle. For example, device 1 for processing user-specific data may be a navigation system, an entertainment system or any other system for processing user-specific data. In addition, for example, arbitrary control devices of a vehicle, including personal data and/or position-based data for their processing, are also possible. For example, a navigation system using the instantaneous position of a vehicle as the site-based data, for example, and using an input for a certain destination as the user input is possible. In this case, for example, with a conventional navigation system, the destination input and optionally also the routing of previous navigations are available, even after termination of the navigation. In addition, there may also be a search by such a navigation system for suitable suggestions for so-called points of interest, for example, restaurants, hotels, movie theaters, gas stations, shopping opportunities, etc. Such searches and the results thereof may optionally be read out by the user at a later point in time and used again. In addition, device 1 for processing user-specific data may also be an entertainment system. For example, a user may select one or more music titles. Alternatively, a user may optionally also enter a specification for a certain type of music. In this case, the entertainment system may automatically search for suitable musical pieces, which correspond to the user-specific preferences. Again in this case, the selection of the user and/or the specifications may be displayed at a later point in time and optionally also selected again.

However, it is not desirable in all cases for a user to have the user inputs he or she has made, the recommendations optionally resulting therefrom and possibly any site-based information available at a later point in time. For example, if the vehicle is a vehicle used alternately by several people, one might not want to allow knowledge of the inputs by a previous user to a subsequent user or for recommendations for the subsequent user to be generated, based on the inputs or preferences of the previous user. For example, it may be a vehicle used alternately by several members of a family. A company vehicle in a vehicle fleet of a corporation used alternately by several employees is also conceivable. In addition, it is also possible for an additional person to enter the vehicle as a passenger, for example, during a trip. Again in this case, one might not want to allow this additional person to gain knowledge of previous inputs or habits of the user.

For this purpose, there may also be a choice for activation or deactivation of a special private operating mode via input unit 11, which is also used for input of user inputs, such as input of a destination, selection of specific points of interest or input of a music title or selection of a style of music. For this purpose, input unit 11 may have a separate input element for activation or deactivation of the private operating mode, for example. In addition, any other input methods, such as input on a touch screen via a corresponding field or input with a rotary dial/selector switch or the like may also be possible.

Device 1 for processing user-specific data may be in the operating mode selected last at an earlier point in time. Alternatively, it is also basically possible for device 1 for processing user-specific data to be in a normal operating mode during initialization or to also be in the private operating mode as the standard. However, by an appropriate input into input unit 11, it may be possible to switch between the normal operating mode and the private operating mode at any point in time. During the normal operating mode, there is generally persistent storage of user inputs and optionally at least a portion of the resulting processing results. In particular, for example, previous inputs for the destinations of a navigation system, preferences for driving style or route selection and optionally for routing as well as an average speed calculated from previous trips or the like may also be stored. For example, a predefined number of previous user inputs (for example, the last 10 or 25 destinations entered) may be stored and displayed for the user as a selection upon input of a new destination.

If a user does not want his or her recent user inputs or the resulting processing results to be available at a later point in time, he or she may activate a private operating mode via input unit 11. In this private operating mode, for example, the further processing of the user inputs may take place in the same way as in the normal operating mode previously. The private operating mode differs from the normal operating mode in particular in that the user inputs entered and/or the resulting processing results are not stored or at least are not stored longer than the period of time during which the private operating mode is activated. In other words, the user inputs entered during the private operating mode as well as the resulting processing results are deleted from data memory 13, 23 at the latest on deactivation of the private operating mode.

If necessary, the storage of user inputs and/or processing results in data memory 13, 23 may also be restricted during the data processing in the private operating mode. In other words, during the private operating mode, only very specific, previously defined data are stored in data memory 13, 23. Additional data, in particular user-specific data of user inputs or processing results, which are not necessarily required for subsequent processing, are not stored at all in data memory 13, 23.

Device 1 for processing the user-specific data may also carry out data processing in the usual manner, even after activation of the private operating mode, by a corresponding input on input unit 11. Thus, for example, navigation to a predefined user-specific destination, ascertaining suggestions for corresponding points of interest based on the user inputs, input of user-specific driving characteristics, selection of a certain musical piece or the search for music titles of a predefined user-specific style of music are still possible to the full extent. After the termination of the private operating mode, the user inputs made during the private operating mode as well as the resulting processing results are then automatically deleted from data memory 13, 23. For this purpose, the corresponding memory area in data memory 13, 23 may be overwritten with a predefined data pattern or a random pattern, for example. This ensures that future readout of the data by an unauthorized person is preventable. It is also possible in particular to store the data in encrypted form in data memory 13, 23. In this case, for example, a special key may be used for storing the user inputs or processing results in data memory 13, 23 during the private operating mode. This key may be different from a key used for storing data in the normal operating mode in particular. Alternatively, it is also conceivable for data to be stored in unencrypted form during the normal operating mode and encrypted only during the private operating mode.

Device 1 for processing the user-specific data may also be coupled to another data processing device 2 via a first communication unit 14. This additional data processing device 2 may be, for example, another external control device inside the same vehicle. In this case, for example, coupling of device 1 for processing user-specific data to an additional processing device 2 via a hard-wired connection is also possible. Alternatively, however, it is also possible in particular for device 1 for processing user-specific data in a vehicle to be coupled to an external data processing device 2 outside of the vehicle via a wireless radio link. In this case, the data exchange between first communication interface unit 14 in device 1 for processing the user-specific data may be coupled via a wireless radio link to second communication unit 24 of external data processing device 2. Device 1 for processing user-specific data may in this case send data to external data processing device 2. External data processing device 2 receives these data via second communication interface unit 24 and processes these data in a processing unit 22. The received data and the results of processing unit 22 may be stored entirely or partially in a database 23. The transmitted data as well as the resulting processing results are also available at a later point in time in this way. For example, processing unit 22 of external data processing device 2 may use these stored data for additional processing operations at a later point in time. User-specific habits may thus be extracted gradually in this way and used for a further optimization of the processing results in external data processing device 2. For example, information about previous trip routes and the previous driving style may be used to optimize the choice of a trip route during navigation based on this information. It is likewise possible to take into account music titles or styles specified previously in the search for new suggestions. The choice of special points of interest, such as restaurants or hotels preferred in the past, may also be taken into account in future searches.

If a user activates the private operating mode in device 1 for processing user-specific data, then together with the data sent out by first communication unit 14, a piece of information about the activated private operating mode may be transmitted to data processing device 2. In this way, data processing device 2 also switches to a private operating mode for processing the data from corresponding device 1 for processing user-specific data. In this case, the recording of data in database 23 of data processing device 2 may also be suppressed or restricted. The restriction or suppression of the storage of data in data processing device 2 is maintained until receiving a corresponding piece of information about deactivation of the private operating mode by corresponding device 1 for processing user-specific data. Alternatively, a signalization of the activated private operating mode may also be transmitted with each data packet, which is transmitted to data processing device 2 by device 1 for processing user-specific data.

If during the processing by data processing device 2, user-specific inputs and/or processing results are buffered in database 23, the stored data are then deleted at the latest on termination of the private operating mode.

It is thus also possible to ensure that, even when there is an external data processing device 2, no confidential data are stored for a longer period of time and possibly read out by a third party at a later point in time.

Figure 2:
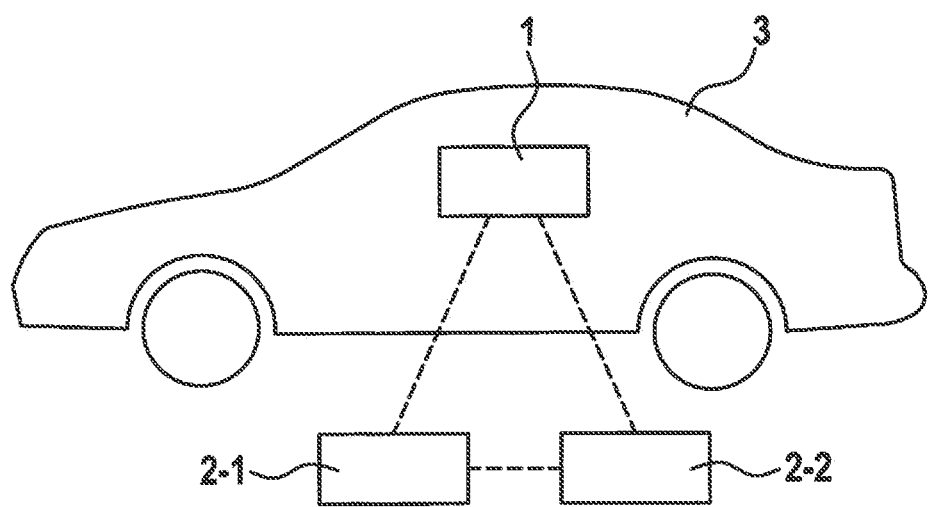
FIG. 2 shows a schematic representation of a vehicle including a device for processing user-specific data according to another specific embodiment.

FIG. 2 shows a schematic representation of a vehicle 3 including a device 1 for processing user-specific data according to one specific embodiment. As shown here, device 1 for processing user-specific data may be in contact with one or multiple external data processing devices 2-1, 2-2 via one or multiple wireless data links. In addition, it is basically also possible for multiple data processing devices 2-1, 2-2 to be in direct contact with one another via a hardwired or wireless data link. In this case, the piece of information about an activated private operating mode may also be exchanged between individual data processing devices 2-1. It is thus possible to ensure that data originating from a point in time when the private operating mode was active will not be stored in any of data processing devices 2-1 after termination of the private operating mode.

FIG. 3 shows a schematic representation of a flow chart, such as that underlying a method for processing user-specific data in a vehicle. User inputs are received in step S1. These user inputs include, among other things, a selection for activation or deactivation of a private operating mode. If a user input has been received for activation of a private operating mode, then there is a switch to a private operating mode in step S2. The user inputs, processing results that are optionally also present, information about the condition of the vehicle, in particular the position, speed, direction of travel and the like may then be transmitted in step S3 together with a piece of information about the selection of activation or deactivation of the private operating mode, to an external data processing device. In this case, processing results may subsequently be received by data processing device 2. Processing results are generated in step S4, based on the received user inputs, in particular based on the user inputs received during the private operating mode. Generation of these processing results may include, for example, calculation of a trip route, searching for a certain destination having predefined characteristics (point of interest), selection of a certain musical piece or a suggestion about musical pieces of a predefined style of music or the like. For example, data detected by sensors may also be included for generation of the processing results. Such sensor-based data may be provided by a vehicle sensor, for example. Such vehicle sensors may include arbitrary sensors, for example, sensors for speed, direction of travel or position of vehicle 3, ambient conditions such as rain, brightness, temperature, etc., or any conditions in the interior of vehicle 3.

In step S5, the user inputs received and/or the processing results generated are stored in a data memory 13, 23. In step S6, the user inputs stored in data memory 13, 23 and/or the processing results stored in data memory 13, 23 during the private operating mode are deleted.

Deletion of data in the data memory in step S6 takes place at the latest when a user input for deactivation of the private operating mode has been received. It is possible in this way for a user to terminate the private operating mode at any point in time and thus immediately delete all confidential data generated during the private operating mode. Immediate removal of all relevant data during the operating mode is thus possible, for example, if another person enters the vehicle, whether expected or unexpected. In this case, for example, a previously selected destination or the choice of a certain music title may be deleted immediately, so that a passenger who might enter the vehicle unexpectedly cannot acquire knowledge of this selection.

For generating the processing results during the activated private operating mode, user inputs and/or processing results originating from a time prior to the activation of the private operating mode may also be used. These user inputs and processing results may also be stored persistently even after activation of the private operating mode. In addition, the storage of user inputs and processing results during the activated private operating mode may be restricted or suppressed entirely.

In summary, the present invention relates to the processing of user-specific data in a vehicle. In particular, the present invention relates to the processing of user-specific data in control systems in a vehicle such as a navigation system or an entertainment system, for example. For this purpose, the device according to the present invention for processing user-specific data is expanded by a private operating mode. In this private operating mode, there is no persistent storage of user inputs and/or the resulting processing results. After termination of the newly created private operating mode, the data stored during the private operating mode are deleted immediately.

What is claimed is:

1. A vehicle, comprising:
a device for processing user-specific data in the vehicle, the device including:
a user input interface;
a processor;
a wired or wireless connection between the processor and another processor; and
a data memory;
wherein:
while the vehicle is driving, the processor is configured to:
receive, via the user input interface, a user selection activating a private operating mode and a user selection deactivating the private operating mode;
switch to the private operating mode responsive to the receipt of the user selection activating the private operating mode;
during the private operating mode:
store in the data memory at least one of (a) user inputs received by the processor from the user input interface and (b) processing results generated by the processor; and
transmit, via the wired or wireless connection and to the other processor, data that includes an identification of the private operating mode being active; and
delete one or more of the at least one of the user inputs and processing results stored in the data memory during the private operating mode responsive to the user selection deactivating the private operating mode; and
the other processor is configured to, in response to deactivation of the private operating mode, delete data that the other processor had stored while the private operating mode had been active.

2. The vehicle of claim 1, wherein the processor is configured to restrict which data is transmitted to the other processor when the private operating mode is active.

3. The vehicle of claim 1, wherein the processor is configured to restrict storage of data in the data memory while the private operating mode is active.

4. The vehicle of claim 1, wherein processing results include at least one of a position, a route, a speed, a statistical analysis, and a search result.

5. The vehicle of claim 1, wherein the transmitted data include information about a condition of the vehicle.

6. The vehicle of claim 1, further comprising a sensor, wherein the processing results are generated by the processor based on data detected by the sensor.

7. The vehicle of claim 1, wherein the transmitted data include a user input received by the processor from the user input interface.

8. The vehicle of claim 1, wherein the transmitted data include a processing result generated by the processor.

9. The vehicle of claim 1, wherein the connection is wireless.

10. The vehicle of claim 5, wherein the condition is of an interior of the vehicle.

11. The vehicle of claim 5, wherein the condition is of a surroundings of the vehicle.

* * * * *